United States Patent Office 2,864,863
Patented Dec. 16, 1958

2,864,863

NITRO AND POLYAMINES AND A PROCESS FOR PRODUCING THESE AMINES

Vernon V. Young, Terre Haute, Ind., assignor to Commercial Solvents Corporation, Terre Haute, Ind., a corporation of Maryland No Drawing. Application June 14, 1957
Serial No. 665,663

7 Claims. (Cl. 260—563)

My invention relates to a process for the production of amines and more particularly to the preparation of nitroamines and polyamines by the reduction of nitroalkanenitriles.

Heretofore, the industry has been unable to prepare polyamines by the reduction of 4-nitroalkanenitriles due to the formation of cyclic compounds. G. B. Buckley and T. J. Elliott, J. C. S. 1947, page 1508, describe several attempts to reduce the 4-nitroalkanenitriles. In a typical reduction, the authors catalytically reduced 3-nitro-3-methyl-n-butyl cyanide in methanol or ammonia by hydrogenation in the presence of Raney nickel catalyst at 100° C. and atmospheric pressure to form a cyclic compound, 5-amino-2,2-dimethylpyrroline-N-oxide or a tautomer.

I have found that I can easily prepare uncyclized nitroamines and polyamines by the reduction of 4-nitroalkanenitriles in a lower fatty acid.

The amines formed in the process of my invention have the following general formulae:

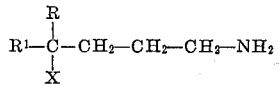

and

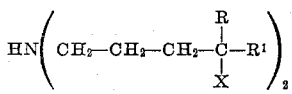

where X is a radical selected from the group consisting of nitro and amino, and R and $R^1$ are selected from the group consisting of alkyl, cycloalkyl, aryl, and aralkyl and R and $R^1$ together may be part of a cycloalkyl ring.

Examples of amines which are included within the scope of these formulae are: 4-nitro-4-methylpentylamine, 4-nitro-4-ethylhexylamine, 3-(1-nitrocyclohexyl)-propylamine, 4-nitro-4-phenylhexylamine, 4-nitro-4-benzylpentylamine, 4-amino-4-methylpentylamine, 4-amino-4-methylhexylamine, 3-(1-aminocyclohexyl)propylamine, 4-amino-4-phenylheptylamine, 4-amino-4-benzylpentylamine, bis(4-nitro-4-methylpentyl)amine, bis(4-nitro-4-phenylpentyl)amine, bis(4-amino-4-benzylhexyl)amine, etc.

The compounds which are used as raw materials in my process are nitroalkanenitriles having the nitro group attached to a tertiary carbon atom. These compounds are easily prepared by the condensation of acrylonitrile and the nitroparaffins in the manner of Buckley et al., J. C. S. 1947, page 1505. The nitriles useful in my invention have the following structural formula:

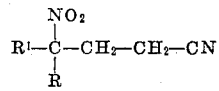

where R and $R^1$ are selected from the group consisting of alkyl, cycloalkyl, aryl, aralkyl, and R and $R^1$ together are cycloalkyl. Typical compounds which may be utilized in my invention are: 3-nitro-3-methylpentylnitrile, 3-nitro-3-methylhexylnitrile, 3-nitro-3-ethyloctylnitrile, 3-(1-nitrocyclohexyl)propionitrile, 3-nitro-3-phenylpentylnitrile, 3-nitro-3-benzylhexylnitrile, etc.

I prefer to reduce catalytically the nitriles used in my invention utilizing a noble metal catalyst since the lower fatty acid solvents of my invention react with many reduction catalysts and reactants to form salts which must be removed from the reaction mixture. Of the noble metal catalysts, I prefer to use palladium on char.

The process of my invention can be run within a temperature range of 10° to 150° C. The temperature selected is dependent upon the relative amounts of the various products desired. If I use a temperature of about 15° C. in my process, I find that 4-nitroamines are formed in relatively large quantities while bis(4-nitroalkyl)amines are formed in smaller amounts. At higher temperatures more of the bis(4-nitroalkyl)amines are formed. The temperatures used in my process are also governed by the desired reaction times, and below 10° C. I find the reduction process to be impractically slow. If a further reduction to the diamine, or bis(aminoalkyl)amine is desired, the nitroamines are further hydrogenated at 75 to 100° C.

I find that pressures ranging from 25–2000 p. s. i. can be utilized in the process of my invention, but I prefer to use pressures of 50 to 100 p. s. i. due to the reduction in equipment costs.

I have found that the lower fatty acids act both as a catalyst and as solvents in my process to give the novel amines of my invention. I prefer to use essentially water-free acids in my process due to the hydrolytic action of water on nitriles which cause a reduction in yields. The acids which may be utilized in my invention are those of low carbon number such as formic, acetic, propionic, etc. I prefer to utilize glacial acetic acid in my invention due to its low cost.

The following specific examples will further illustrate my invention, but it is not intended that my invention be limited to the specific amounts, procedures, or portions set forth therein.

Example I

One mole (142 grams) of 4-nitro-4-methylvaleronitrile, 2 grams of 5% palladium on char, and 700 mls. of glacial acetic acid were shaken in a one liter hydrogenation bomb and cooled to 14° C. Hydrogen was added under 1,500 p. s. i. pressure and the reduction continued until the pressure remained constant without a further addition of hydrogen. After the reduction was complete, the mixture was filtered and the filtrate made acid to congo red with concentrated hydrochloric acid. Excess acetic acid was removed by distillation under reduced pressures and the residue was dissolved in a minimum amount of water. The resulting water solution was made strongly alkaline with 50% sodium hydroxide solution to form an oil which was extracted with ether. The ether extract was distilled to yield 93 grams (64%) of 4-nitro-4-methylpentylamine having a boiling point of 62–64° (1 mm.) and a refractive index of $n_D^{25}$ 1.4523.

After removal of the nitroalkylamine, the residue of the original distillation was dissolved in ether and saturated with hydrogen chloride, the crude bis(nitroalkyl)-amine hydrochloride was precipitated. Recrystallization of the crude product from isopropyl alcohol and ether gave the pure bis(4-nitro-4-methylpentyl)amine hydrochloride having a melting point of 201–205°. The hydrochloride was then treated with alkali to give the free amine.

Example II

To prepare 4-methyl-1,4-pentanediamine and bis(4- amino-4-methylpentyl)amine, 1 mole of 4-nitro-4-methyl-valeronitrile was reduced by the procedure of Example I. When the hydrogen intake ceased at 14° C., the temperature was increased to 75–80° C. and the reduction continued until the pressure remained constant without the addition of hydrogen. The reduction mixture was processed by the procedure of Example I. The crude product was distilled and the ether extract yielded 72 grams (62%) of the diamine which had a boiling point of 174–175° (760 mm.) and a refractive index of $n_D^{25}$ 1.4487. Further distillation gave 16.2 grams (15%) of the bis-amine which had a boiling point of 105–106° C. (0.25 mm.) and a refractive index of $n_D^{25}$ 1.4654.

*Example III*

To prepare 3-(1-nitrocyclohexyl)propylamine and bis-[3-(1-nitrocyclohexyl)propyl]amine, 0.2 mole (36.5 grams) of 3-(1-nitrocyclohexyl)propiononitrile in the presence of 0.5 gram of 10% palladium on charcoal and 150 mls. of glacial acetic acid, was hydrogenated at 25° C. under 50 lbs. pressure. After 2 mole equivalants of hydrogen were taken up, the reaction mixture was filtered and the filtrate made acid to congo red with concentrated hydrochloric acid. The excess solvent was removed by distillation under reduced pressure and the residue extracted with 150 mls. of water. The insoluble bis(nitroalkyl)amine hydrochloride was removed and recrystallized from hot water. The product was recovered as shiny, plate-like crystals having a melting point of 197–199°. The hydrochloride was then hydrolyzed to yield the free base. To extract the mononitroamine, the water extract was made strongly alkaline by the addition of 50% sodium hydroxide solution. The precipitated oil was extracted with ether and the ether extract distilled to obtain 21 grams (60%) of 3-(1-nitrocyclohexyl)propylamine having a boiling point of 97–99° (0.2 mm.) and a refractive index of $n_D^{25}$ 1.4871.

*Example IV*

To prepare 3-(1-aminocyclohexyl)propylamine and bis-3-(1-aminocyclohevylpropyl)amine, the procedure of Example II was followed except for the use of 50 lbs. hydrogen pressure. The crude reduction product was treated by heating with 50% caustic. This caustic treatment was followed by distillation, yielding a distillate containing the diamine which was found to have a boiling point of 69–70° (0.2 mm.) and a refractive index of $n_D^{25}$ 1.4873. The residue was extracted with ether and this extract distilled by yield the triamine which had a boiling point of 171–172° C. (0.1 mm.). This amine solidified on standing. This procedure was followed as this particular group of amines is acetylated in the second reduction stage and must be hydrolyzed with alkali and heating.

*Example V*

To prepare the following compounds the procedure of Example II is followed, utilizing the described acid.

| Product: | Acid |
|---|---|
| 4-nitro-4-ethylheptylamine | Acetic. |
| 4-nitro-4-methylpentylamine | Propionic. |
| 4-nitro-4-methylpentylamine | Formic. |
| 4-nitro-4-phenylpentylamine | Acetic. |
| 4-nitro-4-benzylhexylamine | Acetic. |
| 4-amino-4-phenylhexylamine | Acetic. |
| 4-amino-4-benzylhexylamine | Acetic. |
| bis(4-amino-4-benzylhexyl)amine | Acetic. |
| bis(4-nitro-4-phenylhexyl)amine | Acetic. |
| bis(4-nitro-4-ethylheptyl)amine | Acetic. |

I have found that the amines of my invention have insecticidal properties, are intermediates in the production of cyclic azo colored compounds useful as pigments, and have bacteriostatic properties.

Now having described my invention, what I claim is:

1. In a process for the production of uncyclized amines, the step which consists of contacting a nitrile having the structural formula:

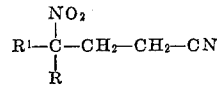

where R and $R^1$ are selected from the group consisting of lower alkyl, benzyl, phenyl, and R and $R^1$ are cyclohexyl with hydrogen in a lower fatty acid solvent at a temperature ranging from about 10° to about 150° C. at hydrogen pressures of 25–2000 p. s. i. and in the presence of a noble metal catalyst.

2. In a process for the production of uncyclized amines, the step which consists of contacting a nitrile having the structural formula:

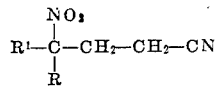

where R and $R^1$ are selected from the group consisting of lower alkyl, benzyl, phenyl, and R and $R^1$ are cyclohexyl with hydrogen in a substantially anhydrous lower fatty acid solvent at a temperature ranging from about 10° to about 150° C. at hydrogen pressures of 25–200 p. s. i. and in the presence of a noble metal catalyst.

3. In a process for the production of uncyclized amines, the step which consists of contacting a nitrile having the structural formula:

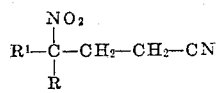

where R and $R^1$ are selected from the group consisting of lower alkyl, benzyl, phenyl, and R and $R^1$ are cyclohexyl with hydrogen in a substantially anhydrous lower fatty acid solvent at a temperature ranging from about 10° to about 150° C. at hydrogen pressures of 50–100 p. s. i. and in the presence of a noble metal catalyst.

4. In a process for the production of uncyclized amines, the step which consists of contacting a nitrile having the structural formula:

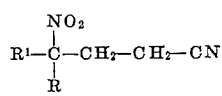

where R and $R^1$ are selected from the group consisting of lower alkyl, benzyl, phenyl, and R and $R^1$ are cyclohexyl with hydrogen in a glacial acetic acid solvent at a temperature ranging from about 10° to about 150° C. at hydrogen pressures of 25–2000 p. s. i. and in the presence of a noble metal catalyst.

5. In a process for the production of uncyclized amines, the step which consists of contacting a nitrile having the structural formula:

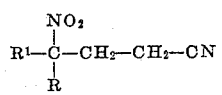

where R and $R^1$ are selected from the group consisting of lower alkyl, benzyl, phenyl, and R and $R^1$ are cyclohexyl with hydrogen in a substantially anhydrous propionic acid solvent at a temperature ranging from about 10° to about 150° C. at hydrogen pressures of 25–2000 p. s. i. and in the presence of a noble metal catalyst.

6. In a process for the production of uncyclized nitroalkyl amines, the step which consists of contacting a nitrile having the following structural formula:

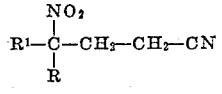

where R and $R^1$ are selected from the group consisting of lower alkyl, benzyl, phenyl, and R and $R^1$ are cyclohexyl with hydrogen in a lower fatty acid solvent at a temperature ranging from about 15° to about 75° C., at hydrogen pressures of 25–2000 p. s. i. and in the presence of a noble metal catalyst.

7. In a process for the production of uncyclized nitroalkyl amines, the step which consists of contacting a nitrile having the following structural formula:

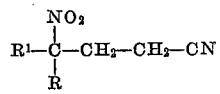

where R and $R^1$ are selected from the group consisting of lower alkyl, benzyl, phenyl, and R and $R^1$ are cyclohexyl with hydrogen in a lower fatty acid solvent at a temperature ranging from about 75° to about 100° C., at hydrogen pressures of 25–2000 p. s. i. and in the presence of a noble metal catalyst.

References Cited in the file of this patent

UNITED STATES PATENTS

| | | |
|---|---|---|
| 2,165,515 | Schmidt | July 11, 1939 |
| 2,253,082 | McNally | Aug. 19, 1941 |
| 2,361,259 | Bruson | Oct. 24, 1947 |
| 2,447,821 | Senkus | Aug. 24, 1948 |
| 2,520,104 | Bahnor | Aug. 22, 1950 |
| 2,523,337 | Bahnor | Sept. 26, 1950 |
| 2,681,935 | Thompson | June 22, 1954 |

FOREIGN PATENTS

| | | |
|---|---|---|
| 832,887 | Germany | Mar. 3, 1948 |
| 598,309 | Great Britain | Feb. 16, 1948 |

OTHER REFERENCES

Bergmann et al.: "J. Org. Chem.," vol. 13, p. 353, June 1948.